US012409674B2

(12) United States Patent
Grigorescu et al.

(10) Patent No.: US 12,409,674 B2
(45) Date of Patent: Sep. 9, 2025

(54) HINGE LASER MARKING

(71) Applicant: THALES DIS FRANCE SAS, Meudon (FR)

(72) Inventors: Sorin Grigorescu, L'isle Adam (FR); Thierry Bon, Saint Cyr sur Mer (FR); Ivo Schoenenberger, Zürich (CH); Christian Sailer, Safenwil (CH)

(73) Assignee: THALES DIS FRANCE SAS, Meudon (FR)

( * ) Notice: Subject to any disclaimer, the term of this patent is extended or adjusted under 35 U.S.C. 154(b) by 0 days.

(21) Appl. No.: 18/686,629

(22) PCT Filed: Aug. 17, 2022

(86) PCT No.: PCT/EP2022/073015
§ 371 (c)(1),
(2) Date: Feb. 26, 2024

(87) PCT Pub. No.: WO2023/025640
PCT Pub. Date: Mar. 2, 2023

(65) Prior Publication Data

US 2024/0375424 A1 Nov. 14, 2024

(30) Foreign Application Priority Data

Aug. 25, 2021 (EP) .................................... 21306154

(51) Int. Cl.
*B42D 25/387* (2014.01)
*B42D 25/24* (2014.01)
*B42D 25/41* (2014.01)

(52) U.S. Cl.
CPC ........... *B42D 25/387* (2014.10); *B42D 25/24* (2014.10); *B42D 25/41* (2014.10)

(58) Field of Classification Search
CPC ....... B42D 25/387; B42D 25/24; B42D 25/41
(Continued)

(56) References Cited

U.S. PATENT DOCUMENTS

2009/0315320 A1* 12/2009 Finn .......................... H01Q 1/38
156/196
2013/0214524 A1 8/2013 Hagemann et al.

FOREIGN PATENT DOCUMENTS

WO 2016177681 A1 11/2016

OTHER PUBLICATIONS

International Search Report (PCT/ISA/210) and Written Opinion (PCT/ISA/237) mailed on Nov. 10, 2022, by the European Patent Office as the International Searching Authority for current International Application No. PCT/EP2022/073015—[11 pages].

* cited by examiner

*Primary Examiner* — Justin V Lewis

(57) ABSTRACT

A secure device for securing an article that includes at least one connection element, at least one data carrier, and at least one security element. The connection element is configured to be connected to the article, and the data carrier is in connection with the connection element and is configured to be connected to the article via the connection element. The connection element is configured to interact with impinging electromagnetic radiation such, that at least one marking element is generated in the connection element upon the impingement of the electromagnetic radiation. The data carrier is configured to interact with impinging electromagnetic radiation such, that at least one further marking element is generated in the data carrier upon the impingement of the electromagnetic radiation. The security element comprises or consists of the marking element of the connection element and of the further marking element of the data carrier.

11 Claims, 3 Drawing Sheets

(58) Field of Classification Search
USPC ........ 283/67, 70, 72, 74, 75, 77, 87, 88, 89, 283/91, 94, 98, 901
See application file for complete search history.

HINGE LASER MARKING

FIELD OF USE

The present invention relates to a secure device for securing an article, to an article comprising such a secure device, to a method of generating a security element in a secure device, and to a method of generating a security element in an article.

BACKGROUND

The connection of a data carrier such as a datapage to a connection element such as a hinge plays an important role in the general security of articles such as passports. A desired security element for securing the connection between the data carrier and the connection element would be to apply during the personalization step of the article a laser marking that covers both the data carrier and the connection element in a manner that both components change their appearance upon a laser irradiation in the same engraving step. In the realization of a personalized feature extending from the connection element to the data carrier the following problem however occurs: Data carrier such as datapages predominately consist of polycarbonate, wherein the use of laser radiation in the infrared region of the electromagnetic spectrum is state-of-the-art. However, using IR-wave length lasers no visible marking of the connection element generally consisting of PET material (or PET-derived polymer compounds) material can be achieved.

SUMMARY

It is an object of the present invention to provide a secure device for securing an article such as a passport, a travel document, a visa or the like that provides an enhanced security in a simple manner.

This object is achieved with a secure device according to claim 1. In particular, a secure device for securing an article such as a passport, a travel document, a visa or the like, is provided, wherein the secure device comprises at least one connection element, at least one data carrier, and at least one security element. The connection element is configured to be connected to the article. The data carrier is in connection with the connection element and is furthermore configured to be connected to the article via the connection element. The connection element is configured to interact i.e. capable of interacting with impinging electromagnetic radiation such, that at least one marking element is generated in the connection element upon the impingement of the electromagnetic radiation. The data carrier is configured to interact i.e. capable of interacting with impinging electromagnetic radiation such, that at least one further marking element is generated in the data carrier upon the impingement of the electromagnetic radiation. The security element comprises or consists of the marking element of the connection element and of the further marking element of the data carrier.

That is, the connection element comprises one or more marking elements that are generated upon the irradiation of electromagnetic radiation onto the connection element. In addition, the data carrier comprises one or more further marking elements that are generated upon the irradiation of electromagnetic radiation onto the connection element. Thus, the secure device according to the invention comprises at least one security element being arranged on both, the data carrier as well as the connection element, whereby a removal of one from the other to be reused in a counterfeit article or in combining a different data carrier and connection element together becomes readily apparent.

The electromagnetic radiation is preferably provided by a source of electromagnetic radiation such as a laser. Hence, the marking element and the further marking element can be seen as laser-marking elements.

It should be noted that the connection element can comprise one or more, e.g. a plurality of marking elements. Likewise, the data carrier can comprise one or more, e.g. a plurality of further marking elements. Explanations made herein with regard to one marking element or to one further marking element likewise apply to two or more marking elements or to two or more further marking elements and vice versa.

The connection element is preferably configured to interact with impinging electromagnetic radiation of particular one or more wavelengths, whereby the marking element is generated. Furthermore, the data carrier is preferably configured to interact with impinging electromagnetic radiation of said particular one or more wavelengths, whereby the further marking element is generated. The particular one or more wavelengths preferably are in the visible region of the electromagnetic spectrum and/or in the ultraviolet region of the electromagnetic spectrum.

That is, it is preferred to generate the marking element in the connection element and the further marking element in the data carrier by the irradiation of the same electromagnetic radiation, i.e. by electromagnetic radiation having the same one or more wavelengths. To this end it is particularly preferred that said electromagnetic radiation lies in the visible region and/or the ultraviolet region of the electromagnetic radiation. In other words, the irradiated electromagnetic radiation preferably does not correspond to electromagnetic radiation in the infrared region.

Consequently, the connection element is preferably configured to interact such as to absorb electromagnetic radiation in the visible region of the electromagnetic spectrum and/or electromagnetic radiation in the ultraviolet region of the electromagnetic spectrum. Likewise, the data carrier is preferably configured to interact such as to absorb electromagnetic radiation in the visible region of the electromagnetic spectrum and/or electromagnetic radiation in the ultraviolet region of the electromagnetic spectrum.

The ultraviolet region of the electromagnetic spectrum preferably comprises wavelengths in the region between 100 nanometer to 400 nanometer, and particularly preferably 355 nanometer. In other words, it is preferred that the marking element and the further marking element are generated upon the irradiation of electromagnetic radiation comprising wavelengths in the region between 100 nanometer to 400 nanometer and particularly preferably being 355 nanometer. This radiation is preferably provided by using the frequency-tripled output of a solid state laser such as a crystal or fibre laser having a fundamental frequency at 1064 nanometer. The visible region of the electromagnetic spectrum preferably comprises wavelengths in the region between 400 nanometer and 780 nanometer, and particularly preferably 532 nanometer. In other words, it is likewise preferred that the marking element and the further marking element are generated upon the irradiation of electromagnetic radiation comprising wavelengths in the region between 400 nanometer to 780 nanometer and particularly preferably being 532 nanometer. This radiation is preferably provided by using the frequency-doubled output of a solid state laser such as a crystal or fibre laser having a fundamental frequency at 1064 nanometer. In other words, it is preferred that no irradiation comprising a wavelength in the infrared region of the electromagnetic spectrum, more preferably 1064 nanometer, is irradiated onto the data carrier and the connection element when the marking element and the further marking element are generated. To this end it is particularly preferred that the marking element and the further marking element are generated upon the irradiation of electromagnetic radiation in the region between 100 nanometer to 450 nanometer.

The marking element preferably corresponds to an opaque element and/or a bleached element and/or an ablated element and/or an evaporated element and/or a colour-changed element and/a bubbling element and/or a bulging element and/or a blurry element and/or a fuzzy element and/or a foaming element. Additionally or alternatively the further marking element preferably corresponds to an opaque element and/or a bleached element and/or an ablated element and/or an evaporated element and/or a colour-changed element and/a bubbling element and/or a bulging element and/or a blurry element and/or a fuzzy element and/or a foaming element.

It should be noted that the marking element and/or the further marking element can be arranged at least partially or entirely within the connection element and the data carrier, respectively. However, it is likewise conceivable that the marking element and/or the further marking element are at least partially or entirely protruding from the connection element and the data carrier, respectively. For instance, a bubbling element or a foaming element could have a protruding, i.e. raised up structure, which protruding or raised up structure preferably protrudes or raises up from a surface of the connection element and the data carrier, respectively.

The connection element preferably comprises or consists of one or more polymers and/or plastics, preferably one or more thermoplastics and/or amorphous polymers, particularly preferably polyester and/or polyester-based polymers such as polyethylene terephthalate (PET) or polybutylene terephthalate (PBT) and/or polyolefin-based polymers such as polypropylene and polyethylene and/or thermoplastic elastomers such as polyurethane and styrenic block copolymers. The data carrier preferably comprises or consists of one or more polymers and/or plastics, preferably one or more thermoplastics and/or amorphous polymers, particularly preferably polycarbonate and/or polycarbonate blends and/or polycarbonate co-extrudates.

The connection element and the data carrier preferably are of different materials. In fact, it is particularly preferred that the connection element comprises or consists of polyester and/or polyester-based polymers, and that the data carrier comprises or consist of polycarbonate and/or polycarbonate blends and/or polycarbonate co-extrudates.

The connection element and/or the data carrier can be transparent or translucent. A transparent connection element and/or a transparent data carrier preferably comprises one of more transparent polymers and/or plastics.

The connection element is preferably bendable and/or flexible. The connection element can comprise or consist of a fabric preferably comprising fibres of one or more polymers and/or plastics. Additionally or alternatively the connection element can comprise one or more sheets. A sheet is understood as an intact element as opposed to a fabric being composed of threads and including holes or openings, for instance. Additionally or alternatively the connection element can comprise one or more layers. For instance, the connection element can be provided by a fabric and additionally also by one or more sheets, and wherein the fabric as well as the sheets are provided in the form of layers. The data carrier preferably comprises one or more layers and/or is configured rigidly.

The connection element can be of various designs. For instance, the connection element can be provided in the form of a fabric such as a non-woven fabric or woven fabric or a knitted fabric. It is furthermore preferred that said fabric is provided by one or more fibres. The fibres in turn preferably correspond to one or more polymers and/or one or more plastics as mentioned above. That is, it is preferred that the connection element corresponds to a fabric being formed by polymer fibres and/or plastics fibres, preferably being formed by fibres of one or more thermoplastics, particularly preferably being formed by fibres of polyester and/or polypropylene and/or polyurethane and/or polyester-based polymer and/or polypropylene-based polymer and/or polyurethane-based polymer. The fibres can be monofilaments or multifilaments. A diameter of the fibre preferably is between 1 micrometer to 500 micrometer, more preferably between 10 micrometer to 100 micrometer such as between 70 and 80 micrometer. It is furthermore preferred that the connection element in the form of the fabric comprises openings, i.e. mesh openings. A size of a mesh opening preferably is between 10 micrometer to 1000 micrometer, more preferably between 50 micrometer to 500 micrometer, and particularly preferably about 100 micrometer. Moreover, a mesh cut of the connection element in the form of the fabric preferably is between 10 threads per centimetre to 100 threads per centimetre, such as between 50 threads per centimetre to 60 threads per centimetre, for instance 57 threads per centimetre.

In addition or alternatively, the connection device can comprises one or more sheets. Said one or more sheets preferably correspond to layers of one or more polymers and/or one or more plastics, preferably of one or more layers of thermoplastics, particularly preferably to one or more layers of polyester and/or polyester-based polymers and/or polyolefin-based polymers and/or thermoplastic elastomers as mentioned above.

In addition, it is conceivable that the data carrier comprises one or more layers. Said one or more layers preferably correspond to layers of one or more polymers and/or one or more plastics, preferably of one or more layers of thermoplastics and/or amorphous polymers, particularly preferably polycarbonate and/or polycarbonate blends and/or polycarbonate co-extrudates as mentioned above.

Two or more layers of the connection element are preferably connected to one another by lamination. Likewise, two or more layers of the data carrier are preferably connected to one another by lamination.

The connection element is preferably at least partially embedded in the data carrier. Alternatively, the connection element is preferably attached to a surface of the data carrier.

As mentioned earlier, the connection element and the data carrier preferably comprise or consist of one or more polymers and/or plastics. The data carrier furthermore preferably comprises one or more layers. A conceivable connection of the connection element with the data carrier can be achieved by laminating at least part of the connection element between the layers of the data carrier. Again another conceivable connection is a lamination of at least part of the connection element onto a surface of the data carrier, in particular onto a surface of a layer of the data carrier. Other connections are however likewise conceivable. For instance, the connection element can be sewed or glued or otherwise attached, e.g. by ultrasonic welding, to the data carrier.

Furthermore, it should be noted that the connection element and/or the data carrier can comprise one or more layers being different from the ones as just described. For instance, metallic layers, coloured layers, etc., as they are known in the field of the art could also be present.

It is in any case preferred that only part of the connection element is connected to the data carrier, wherein another part of the connection element is not connected to the data carrier. Said unconnected part, or at least part of it, preferably serves the purpose of connecting the connection element, and thereby the data carrier, to the article to be secured by the secure device. To this end it is preferred that the unconnected part of the connection element could protrude from the data carrier.

Depending on the data carrier, the connection element in the region of its connection to the data carrier can be visible or invisible to an observer. For instance, if the data carrier is transparent, for example because it consists of transparent layers of thermoplastics, a connection element being embedded between the layers or attached to one of these layers would be visible. However, if the data carrier at least in the region of its connection to the connection element is non-transparent, an embedded connection element would not be visible for an observer. A non-transparent data carrier could be provided by coloured layers of polymers and/or plastics such as white polycarbonate.

The security element preferably has the shape of an image and/or of an alphanumeric character, That is to say, the marking element of the connection element and the further marking element of the data carrier preferably constitute an image and/or an alphanumeric character. Non-exhaustive examples of an image are a portrait or photograph or biometric information such as a fingerprint e.g. of a holder of the article to be secured such as a passport, an outline of a country, a state coat of arms, a state flag, a signature, geometric objects such as lines, circles, etc. Non-exhaustive examples of an alphanumeric character are a date of birth, a name, a social security number e.g. of the holder of the article to be secured, an expiry date, etc.

The security element preferably comprises at least a first part and a second part, and wherein the first part is provided by the marking element and the second part is provided by the further marking element. It is furthermore preferred that the first part and the second part complement one another. Moreover, it Is preferred that the first part and the second part are arranged immediately adjacent to one another.

That is, it is preferred that the security element comprises at least two parts, wherein a first part is provided by the marking element of the connection element and the second part is provided by the further marking element of the data carrier. It is furthermore preferred that said parts are arranged immediately adjacent to one another. For instance, if the security element corresponds to an alphanumeric character such as an "A", it is preferred that part of the letter "A" is arranged on the connection element and another part of the letter "A" is arranged on the data carrier such, that the two parts complement or complete the letter "A". In other words, the parts are preferably arranged such, that the security element has an uninterrupted appearance. Again in other words, the security element preferably extends across edges of the connection element and the data carrier.

As has already been mentioned initially, both data carrier and connection element are protected against removing one from the other to be reused in a counterfeit article or in combining a different data carrier/connection element pair together by the security element being arranged on both, the data carrier and the connection element. The security of said security element is further enhanced by providing the security element across the data carrier/connection element edge. Namely, if one of the parts of the security element is not compatible with the other part, then it is perceivable to an observer that the security element is not genuine but has been forged. For instance, it is hereby possible to check in a simple manner whether the data carrier is genuine or whether it has been replaced by a forged data carrier. Thus, the security of the security element can be further enhanced by providing the marking element and the further marking element in register with each other such that if either of the two is a counterfeit it is more difficult to produce than without such registration requirement.

It should be noted that the secure device can comprise additional security features as they are known in the art. For instance, the data carrier and/or the connection element can comprise security prints, embossings or security threads. Other features such as electronic modules, antennas, etc. can likewise be present in the data carrier.

In a further aspect, an article, in particular a passport, a travel document, a visa or the like, is provided, wherein the article comprises at least one secure device as described above.

Any explanations made herein regarding the secure device likewise apply to the article comprising the secure device and vice versa.

That is, the article to be secured preferably corresponds to a passport, a travel document, a visa or the like, wherein the data carrier preferably constitutes a datapage and the connection element preferably constitutes a hinge used to connect the datapage to the article.

The article preferably furthermore comprises at least one substrate. The connection element preferably is in connection with the substrate, in particular connected to the substrate. The data carrier is preferably in connection with or connected to the substrate via the connection element. The substrate preferably comprises or consists of one or more textiles and/or one or more fabrics and/or one or more paper-based compounds and/or one or more cardboard-based compounds and/or one or more plastics and/or one or more adhesive compounds. The substrate preferably is a booklet and/or a visa page of a passport.

The article preferably further comprises at least one substrate, and wherein the substrate is configured to interact with impinging electromagnetic such, that at least one additional marking element is generated in the substrate upon the impingement of the electromagnetic radiation, whereby an additional security element is generated. To this end it is preferred that the one or more additional marking elements are generated upon the irradiation of the electromagnetic radiation onto the connection element and/or the data carrier. In addition or alternatively, the one or more marking elements are preferably generated in the region of the connection element and/or the data carrier. Additionally or alternatively, the additional security element preferably complements the security element at least in a checking position of the article.

That is, it is furthermore preferred that the substrate is configured to interact with impinging electromagnetic radiation of the particular one or more wavelengths that are also usable to generate the marking elements in the connection element and the further marking elements in the data carrier. That is, the substrate is preferably configure to interact such as to absorb electromagnetic radiation in the visible region of the electromagnetic spectrum and/or electromagnetic radiation in the ultraviolet region of the electromagnetic spectrum.

Upon the irradiation of electromagnetic radiation onto the substrate, one or more additional marking elements are preferably generated. These additional marking elements preferably constitute an additional security element. The additional security element preferably complements the security element being provided by the connection element and the data carrier at least in a checking position of the article.

To this end it is preferred that the data carrier and preferably at least partially also the connection element are arranged movable with respect to the substrate from a starting position into a checking position. The checking position is understood as the position wherein the data carrier and preferably at least partially also the connection element overlap at least part of the substrate comprising the additional marking elements. For instance, if the article is a passport, the substrate preferably corresponds to the booklet and/or to a visapage, and wherein the data carrier in the form of a datapage is movable with respect to the booklet, for instance an inner cover of the booklet, and/or the visapage by turning the datapage. In the event that the booklet such as its inner cover comprises the additional marking elements, the checking position is understood as the position wherein the datapage overlaps the inner cover. In the event that the visapage comprises the additional marking elements, the checking position is understood as the position wherein the datapage overlaps said visapage. In the latter case the starting position could be the position wherein the datapage overlaps the inner cover, wherein the datapage is transferred from said starting position into the checking position by turning the datapage such that it overlaps with the visapage.

The connection element preferably comprises one or more openings, and wherein one or more additional marking elements in the substrate are aligned with respect to one or more openings of the connection element in the checking position of the article.

That is, the connection element preferably comprises one or more openings. In fact, the connection element preferably corresponds to a fabric comprising one or more mesh openings, wherein the said openings in the connection element preferably correspond to mesh openings. It is preferred that one or more of these openings or mesh openings are aligned with respect to one or more additional marking elements in the substrate when the article is in its checking position.

The alignment preferably corresponds to an overlapping between the additional marking elements and corresponding openings or mesh openings. That is, when the article is in the checking position it is preferred that a particular additional marking element is located at a position where a particular opening or mesh opening of the connection element is located. Again in other words it is preferred that the additional marking elements and the openings or mesh openings of the connection element are congruent with one another in the checking position. It is hereby possible to additionally check in a simple manner whether an assignment of the secure device, in particular of the data carrier being in connection with the connection element, to the article, in particular to the substrate, is correct. Namely, if the additional marking elements in the substrate are not compatible with the openings or mesh openings of the connection element, the observer checking the article will readily recognize that the data carrier does not belong to the article. The above preferably applies in the event of a data carrier and connection element being transparent or translucent.

In the event that the data carrier and/or the connection element is not transparent or translucent but opaque, for instance, an alignment or registration of the additional marking elements and the corresponding opening or mesh openings cannot be checked. In this case the data carrier such as the data page or visa page preferably is turned away from the substrate comprising the additional marking element, whereby the additional marking element can be inspected and be the subject of a verification as well.

The substrate preferably comprises at least one printed element and/or a reactive element that is configured to interact with impinging electromagnetic radiation such, that the additional marking element is generated. The printed element preferably is printed using a printing technique as it is known in the art, for instant offset, silk screen, or Intaglio printing. The reactive element preferably is a reactive pigment and/or a reactive additive and/or a reactive colorant. The additional marking element preferably corresponds to an opaque element and/or a bleached element and/or an ablated element and/or an evaporated element and/or a colour-changed element and/a bubbling element and/or a bulging element and/or a blurry element and/or a fuzzy element and/or a foaming element.

That is to say, it is preferred that the substrate comprises at least one printed element and/or reactive element that is configured to interact with impinging electromagnetic radiation, whereby the additional marking element is formed.

It should be noted that the substrate can comprise additional security features as they are known in the art. For instance, the substrate such as the booklet, for instance the inner cover or a visa page can comprise prints or embossings. To this end it is particularly preferred that the security element of the secure device and/or the additional security element together with said additional security feature allows a further verification of the article. For instance, the additional security feature of the substrate could provide a reference, against which the security element and/or the additional security element can be compared. In the event that the security element and/or the additional security element correspond to the reference, an authenticity of the article can be inferred. For example, the security element and/or the additional security element can correspond to an image and/or an alphanumeric character, and the security feature or the reference could correspond to the same image and/or the same alphanumeric character.

In a further aspect a method of generating a security element in a secure device for securing an article such as a passport, a travel document, a visa or the like, is provided. The secure device preferably is a secure device as described above. The method comprising the steps of i) providing at least one connection element, and ii) providing at least one data carrier. The connection element is configured to be connected to the article. The data carrier is in connection with the connection element and is configured to be connected to the article via the connection element. The connection element is configured to interact with impinging electromagnetic radiation such, that at least one marking element is generated in the connection element upon the impingement of the electromagnetic radiation. The data carrier is configured to interact with impinging electromagnetic radiation such, that at least one further marking element is generated in the data carrier upon the impingement of the electromagnetic radiation. The method further comprises the step of iii) irradiating electromagnetic radiation onto the connection element and the data carrier, wherein the security element comprising or consisting of the marking element of the connection element and of the further marking element of the data carrier is generated.

In a further aspect a method of generating a security element in an article such as a passport, a travel document, a visa or the like, is provided. The article preferably is an article as described above. The method comprises the steps of i) providing at least one substrate, ii) providing at least one secure device as described above, and iii) irradiating electromagnetic radiation onto the connection element and the data carrier, wherein the security element comprising or consisting of the marking element of the connection element and of the further marking element of the data carrier is generated.

It should be noted that any explanations made with regard to the secure device and the article likewise apply to the methods of generating the security element and vice versa.

Furthermore preferred is to irradiate the electromagnetic radiation also onto the substrate, wherein at least one additional marking element is generated in the substrate, and wherein the additional marking element preferably constitutes an additional security element.

To this end it is particularly preferred that a connection element comprising openings such as a fabric comprising mesh openings is provided, and wherein the electromagnetic radiation is irradiated onto the substrate through particular one or more of the openings or mesh openings. Additionally or alternatively, the connection element and/or the data carrier can be translucent to the electromagnetic radiation of one or more wavelengths, such that only a part of the radiation energy is absorbed by the connection element and/or the data carrier, while another part of the radiation energy can pass through the substrate being arranged after the connection element and/or the data carrier. In this case additional marking elements can be generated in the substrate which are in addition to the marking elements generated in the connection element and/or the further marking elements generated in the data carrier. In other words, a full marking may be duplicated between the connection element and/or the data carrier and the substrate rather than further marking elements being generated in the location of the openings or mesh openings only.

Moreover, it is preferred that electromagnetic radiation is irradiated onto the data carrier and/or the connection element and/or the substrate having the same one or more wavelengths. It is furthermore preferred that said electromagnetic radiation comprises one or more wavelengths in the visible region of the electromagnetic spectrum and/or in the ultraviolet region of the electromagnetic spectrum. That is, and as mentioned earlier, it is preferred to irradiate electromagnetic radiation onto the data carrier and the connection element and preferably additionally also onto the substrate that has one or more wavelengths being in the region between 100 nanometer to 400 nanometer, and particularly preferably 355 nanometer. It is likewise preferred to irradiate electromagnetic radiation having one or more wavelengths in the region between 400 nanometer to 780 nanometer and particularly preferably being 532 nanometer.

It is furthermore preferred that the electromagnetic radiation is irradiated onto the data carrier and the connection element and preferably additionally also onto the substrate in a single pass and/or with same settings.

In other words, it is preferred to irradiate the electromagnetic radiation onto these components without any interruptions and/or without moving these components. That is, the connection element and the data carrier are preferably stationary while the electromagnetic radiation is irradiated. In particular, it is preferred to irradiate the electromagnetic radiation in the form of a so-called vector lasering and/or a so-called bitmap lasering. In the former case, the laser follows with pulses of a preferably fixed setting a contour of the security element, e.g. the contour of the character "A". In the latter case, regardless of the security element, e.g. the characters or picture data, a whole area of the security element is scanned, wherein the power of the laser pulses is preferably increased at the dedicated positions. Hence, in this context single pass means that in the same scanning pass the marking element and the further marking element are generated in the connection element and the data carrier.

The settings preferably are laser settings such as a pulse frequency, a laser power, a resolution, an intensity, etc.

In a further aspect, a method of producing a secure device for securing an article such as a passport, a travel document, a visa or the like, is provided. The method comprises the steps of i) providing at least one connection element, ii) providing at least one data carrier, and iii) providing at least one security element. The connection element is configured to be connected to the article. The data carrier is in connection with the connection element and is configured to be connected to the article via the connection element. The connection element is configured to interact with impinging electromagnetic radiation such, that at least one marking element is generated in the connection element upon the impingement of the electromagnetic radiation. The data carrier is configured to interact with impinging electromagnetic radiation such, that at least one further marking element is generated in the data carrier upon the impingement of the electromagnetic radiation. The security element comprises or consists of the marking element of the connection element and of the further marking element of the data carrier.

In a further aspect, a method of producing an article such as a passport, a travel document, a visa or the like, is provided. The method comprises the steps of i) providing at least one substrate, and ii) providing at least one secure device comprising at least one security element as described above.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings.

DETAILED DESCRIPTION

Figure 1A:
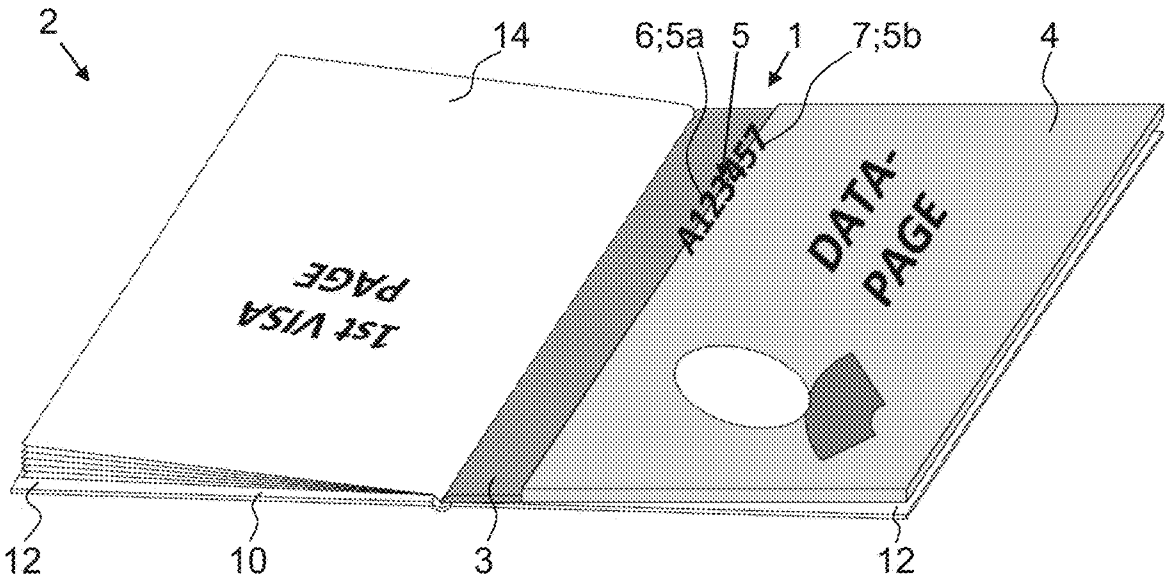
FIG. 1*a* shows a perspective view of an article comprising a secure device that has a connection element, a data carrier and a security element according to the invention in a first position.

Aspects of the secure device 1 for securing an article 2 such as a passport, a travel document, a visa or the like according to the invention shall be further illustrated by means of the figures.

The secure device 1 comprises a connection element 3 in the form of a hinge and a data carrier 4 in the form of a datapage. The article 2 to be secured corresponds here to a passport comprising a substrate 10 in the form of a booklet having covers 12, a title page 13, and visa pages 14. That is, the secure device 1 according to the invention is configured to secure a document 2 having a multipage structure.

The connection of the datapage 4 to the hinge 3 plays an important role in the general security of articles 2 having a multipage structure such as a passport in order to prevent an unnoticed exchange of the datapage 4 by removing the datapage 4 from the hinge 3 and subsequently recombining the hinge 3 to a different datapage, which is a common fraud scenario for passports 2. In this context, the invention proposes a tamper-evident security element 5 that extends from the datapage 4 to the hinge 3 being connected to the article 2 such as the passport and thereby secures the connection between the passport 2 and the hinge 3 being in connection with the datapage 4.

The security element 5 consists here of marking elements 6 in the hinge 3 and of further marking elements 7 in the datapage 4. Said marking elements 6 and further marking elements 7 were generated by irradiating electromagnetic radiation onto the hinge 3 and the datapage 4. The hinge 3 consists of polyethylene terephthalate and the datapage 4 comprises polycarbonate. In particular, the security element 5 was generated by using electromagnetic radiation in the ultraviolet region of the electromagnetic spectrum, in particular with laser radiation having a wavelength of 355 nanometer. Usage of electromagnetic radiation in a wavelength region other than infrared allowed the generation of the security element 5 being a visible, joint marking in both the PET hinge material and the PC datapage material. Furthermore, not only was the security element 5 generated in the hinge 3 and the datapage 4 with electromagnetic radiation being beyond the infrared, but also with electromagnetic radiation of the same wavelength, i.e. 355 nanometer in both cases. In addition, the electromagnetic radiation was irradiated onto the datapage 4 and the hinge 3 in a single pass, that is, without any interruptions and without moving the article 2. The security element 5, in particular the marking elements 6 and the additional marking elements 7, correspond here to laser marks in the form of opaque elements.

Figure 1B:
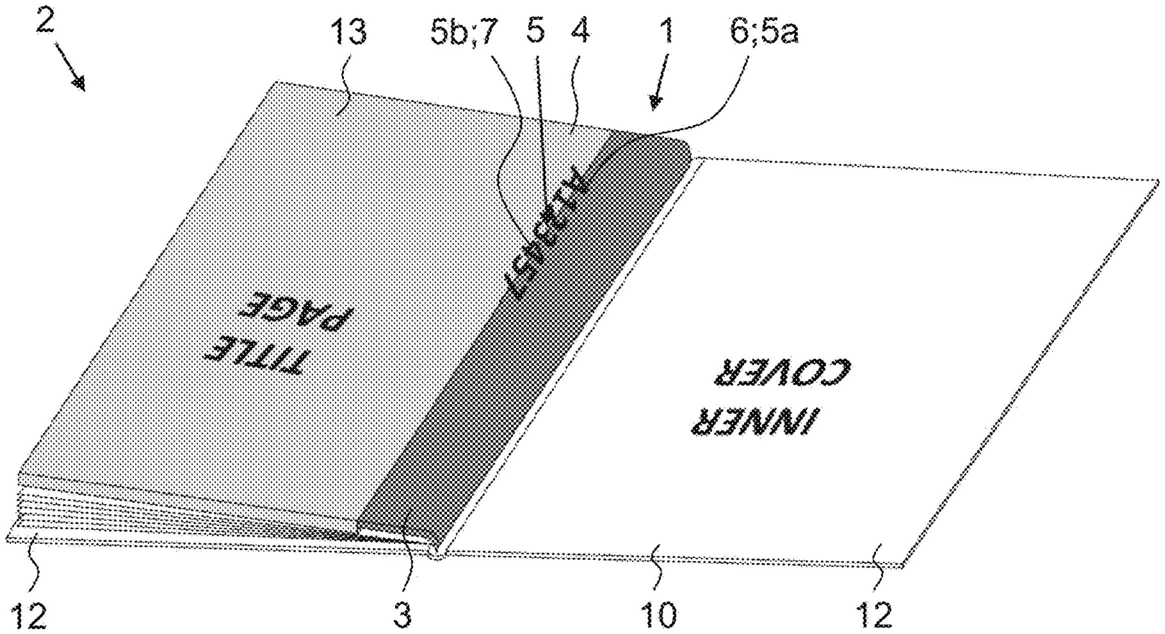
FIG. 1*b* shows a perspective view of the article according to FIG. 1*a* in a second position.
Figure 2:
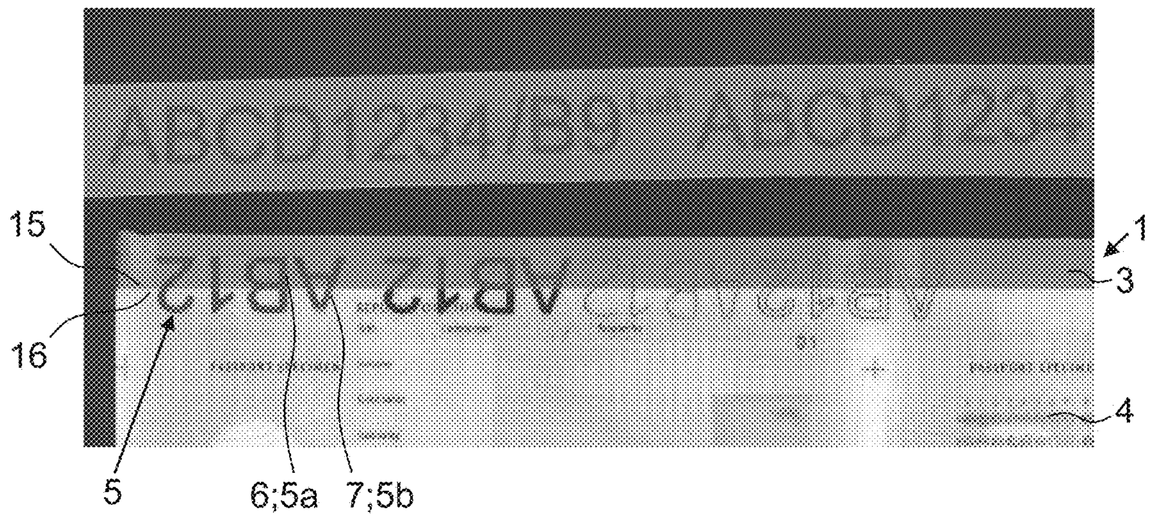
FIG. 2 shows a partial top view on another article comprising the secure device according to the invention.
Figure 3A:
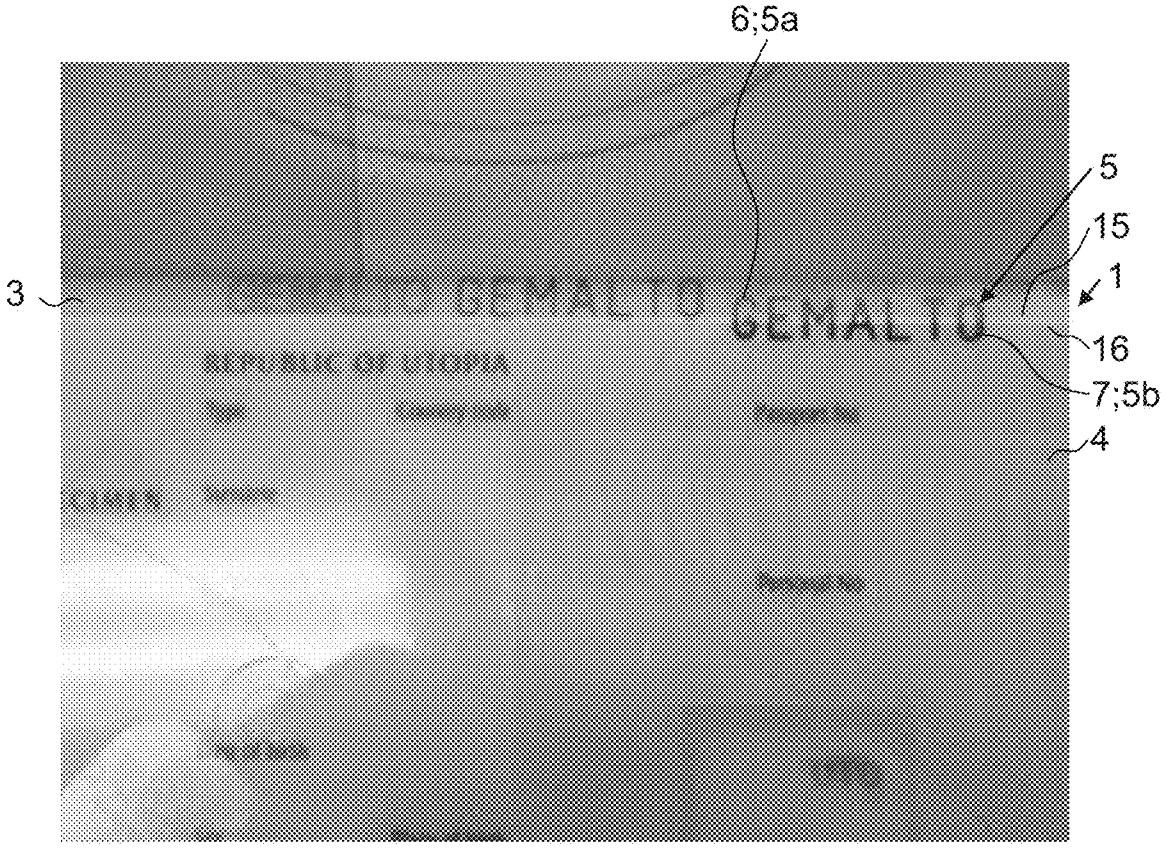
FIG. 3*a* shows a partial top view on another article comprising the secure device according to the invention.
Figure 3B:
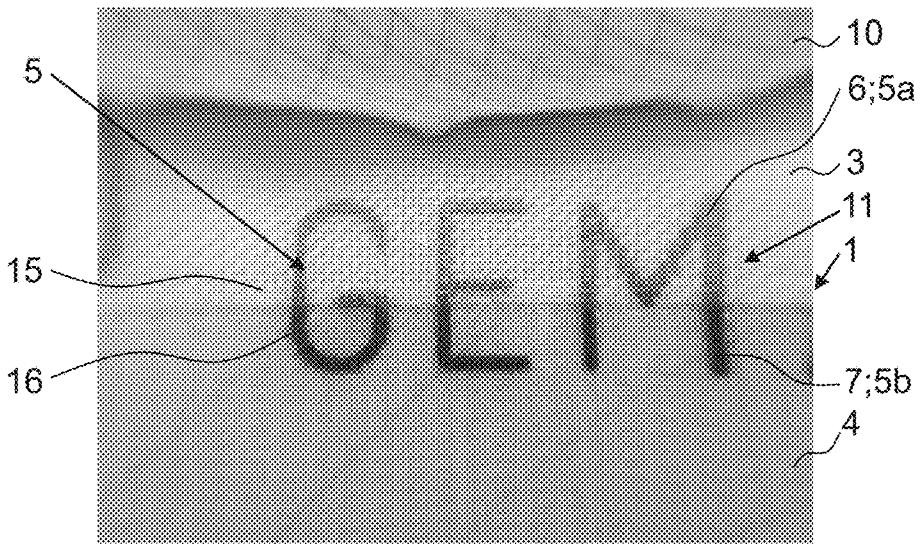
FIG. 3*b* shows an enlarged view on the secure device of the article according to FIG. 3*a;*
Figure 4:
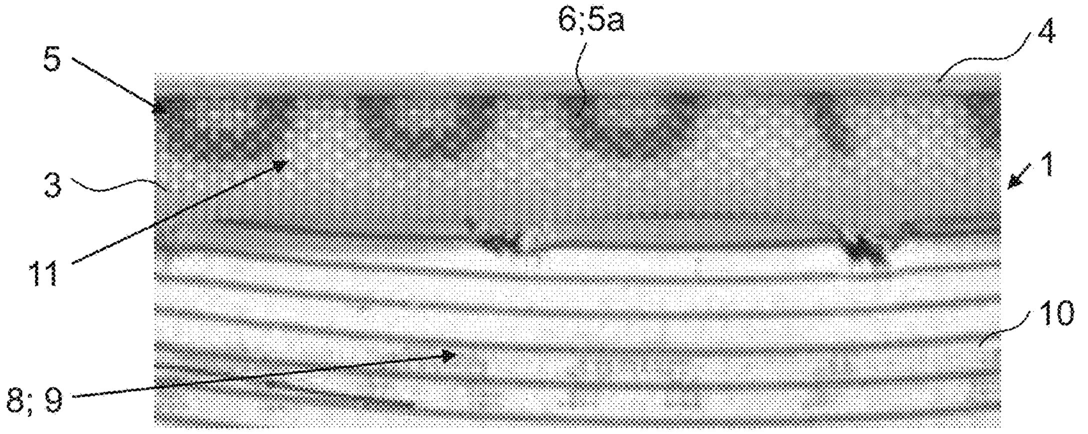
FIG. 4 shows a partial top view on an article comprising a secure device having an additional security element according to the invention.
Figure 5:
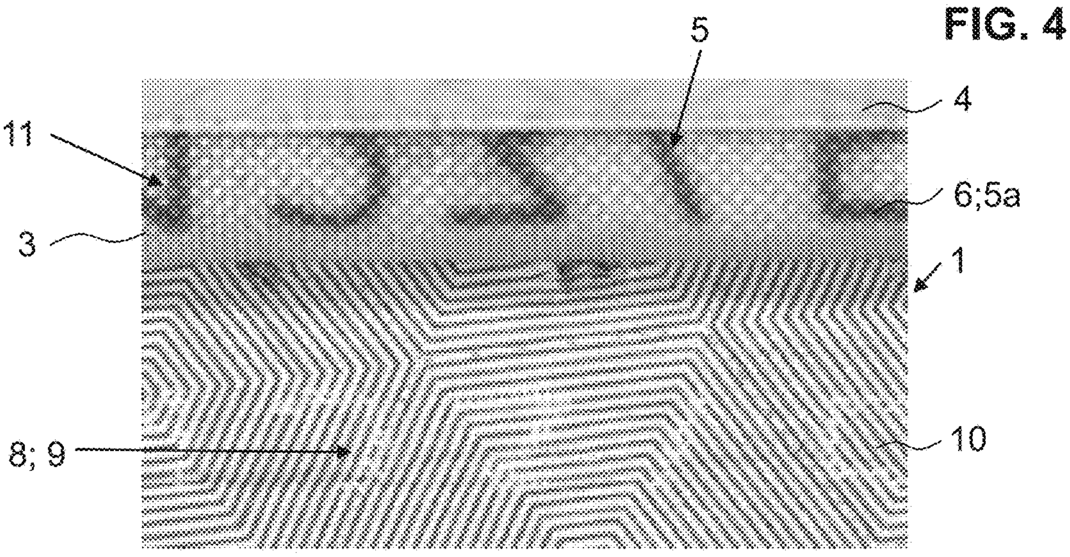
FIG. 5 shows a partial top view on another article comprising a secure device having an additional security element according to the invention.

Moreover, and as best seen in FIGS. 1*a* and 1*b*, the datapage 4 is connected to the substrate by means of the hinge 3, wherein the hinge 3 is bendable and flexible such that the datapage 4 can be moved with respect to the covers 12 by turning the datapage 4. Both, the hinge 3 and the datapage 4 comprise a common security element 5 in the form of the alphanumeric character "A1233457" that extends across part of the hinge 3 and part of the datapage 4. In particular, the security element 5 is arranged in adjacent edge regions 15, 16 of the hinge 3 and the datapage 4.

As becomes apparent from FIGS. 1*a* to 3*b*, the parts 5*a*, 5*b* of the security element 5 being provided in the hinge 3 and the datapage 4 complement one another. Namely, in FIGS. 1*a* and 1*b*, an upper part 5*a* of the alphanumeric character "A1233457" is formed in the hinge 3 and a lower part 5*b* of the alphanumeric character "A1233457" is formed in the datapage 4 immediately adjacent to the upper part Sa. As such, the security element 5 has an uninterrupted appearance.

Additionally, in the example depicted in FIGS. 1*a* and 1*b*, the security element 5 extends entirely through the datapage 4 and the hinge 3 such that a top side of the security element 5 is visible in the configuration depicted in FIG. 1*a* and a bottom side of the security element 5 is visible upon turning the datapage 4 and in the configuration depicted in FIG. 1*b*.

FIGS. 2 to 5 depict further examples of the secure device 1 according to the invention. Namely, the secure device 1 of FIG. 2 comprises a security element 5 in the form of the alphanumeric character "AB12 AB12" and the secure device 1 of FIGS. 3*a* to 36 comprises a security element 5 in the form of the letters "GEMALTO". It should be noted that the invention can be realized with different hinge technologies. For instance, the hinge 3 can be embedded into the datapage 4. Alternatively, it is likewise conceivable that the hinge 3 is attached to a surface of the datapage 4. Furthermore, different datapage structures are conceivable. For example, the hinge 3 can be visibly or invisibly embedded into the datapage 4. In the former case, it is preferred that the datapage 4 at least in its region of connection with the hinge 3 is translucent. In the latter case, it is preferred that the datapage 4 at least in its region of connection with the hinge 3 is non-translucent, for instance opaque. Furthermore, the hinge 3 itself can have different designs. For instance, the hinge 3 can be a solid hinge, i.e. a hinge without any openings or the like but being composed of continuous one or more sheets, for instance. However, it is likewise conceivable that the hinge 3 comprises openings 11, for instance mesh openings of a hinge in the form of a fabric, see FIGS. 3*a* and 3*b*.

The provision of a hinge 3 with openings 11 allows the generation of additional security elements 9 in the article 2, in particular in the substrate 10 of the article 2 such as the inner cover 12 or the visa page 14. In fact, and as apparent in FIGS. 4 and 5, the hinge 3 with openings 11 enabled to additionally mark through the hinge 3 onto the inner cover 12 or the first visa page 14 so as to achieve a paper marking or an ink bleaching of these components 12, 14. In this regard it should be noted that the generation of additional markings such as a paper marking or an ink bleaching in the inner cover or the like can likewise be obtained in the event that the hinge 3 is transparent or translucent. A further possibility is that the data page may be transparent in the hinge attachment region and markings in the data page may be at least partially repeated in the inner cover (or visa page respectively).

These markings can be seen as additional markings 8 that are generated in the substrate 10 upon the impingement of the electromagnetic radiation, whereby the additional security element 9 is generated.

LIST OF REFERENCE SIGNS

| | |
|---|---|
| 1 | secure device |
| 2 | article |
| 3 | connection element |
| 4 | data carrier |
| 5 | security element |
| 5a, 5b | part of security element |
| 6 | marking element |
| 7 | further marking element |
| 8 | additional marking element |
| 9 | additional security element |
| 10 | substrate |

-continued

| LIST OF REFERENCE SIGNS | |
|---|---|
| 11 | opening |
| 12 | cover |
| 13 | title page |
| 14 | visa page |
| 15 | edge region |
| 16 | edge region |

The invention claimed is:

1. An article, wherein the article is at least one s elected from a group comprising a passport, a travel document, and a visa, wherein the article comprises for securing the article, the secure device comprising:

at least one connection element;

at least one data carrier; and at least one security element;

wherein the connection element is configured to be connected to the article, and wherein the ta data carrier is in connection with the connection element and is configured to be connected to the article via the connection element, wherein the connection element is configured to interact with the impinging electromagnetic radiation such, that the at least one marking element is generated in the connection element upon the impingement of the electromagnetic radiation, wherein the data carrier is configured to interact with impinging electromagnetic radiation such, that at least one further marking element is generated in the data carrier upon the impingement of the electromagnetic radiation, and wherein the security element comprises of the marking element of the connection element and of the further marking element of the data carrier, the article further comprising at least one substrate, and wherein the substrate is configured to interact with impinging electromagnetic radiation such that at least one additional marking element is generated in the substrate upon the impingement of the electromagnetic radiation, whereby an additional security element is generated, and wherein the additional security element wavy complements the security element at least in a checking position of the article.

2. The article according to claim 1, wherein the connection element is configured to interact with impinging electromagnetic radiation of one or more wavelengths, whereby the marking element is generated, and wherein the data carrier is configured to interact with impinging electromagnetic radiation of said one or more wavelengths, whereby the further marking element is generated, and wherein the one or more wavelengths are in a visible region of an electromagnetic spectrum and/or in an ultraviolet region of the electromagnetic spectrum.

3. The article according to claim 1, wherein at least one of the marking element and the further marking element corresponds to one or more selected from a group comprising an opaque element, a bleached element, an ablated element, an evaporated element, a colour-changed element, a bubbling element, a bulging element, a blurry element, a fuzzy element, and a foaming element.

4. The article according to claim 1, wherein the connection element and data carrier comprise of one or more polymers or plastics.

5. The article according to claim 1, wherein the connection element is bendable or flexible, and wherein the connection element comprises fabric comprising fibres of one or more polymersor plastics, wherein the connection element comprises one or more sheets, wherein the connection element comprises one or more layers, and wherein the data carrier comprises one or more layers and is configured rigidly.

6. The article according to claim 1, wherein the security element has a shape of an image or of an alphanumeric character, and wherein the security element comprises at least a first part and a second part, and wherein the first part is provided by the marking element and the second part is provided by the further marking element, the first part and the second part complementing one another or being arranged immediately adjacent to one another.

7. The article according to claim 1, wherein the connection element comprises one or more openings, and wherein the one or more additional marking element in the substrate is aligned with respect to the one or more openings of the connection element in the checking position of the article.

8. The article according to claim 1, wherein the substrate comprises at least one selected from a group comprising a printed element and a reactive element that is configured to interact with impinging electromagnetic radiation such that the additional marking element is generated, the printed element being printed by offset printing, silk screen printing, or Intaglio printing, and the reactive element being a reactive pigment, a reactive additive, or a reactive colorant, and wherein the additional marking element corresponds to at least one selected from a group comprising an opaque element, a bleached element, an ablated element, an evaporated element, a colour-changed element, a bubbling element, a bulging element, a blurry element, a fuzzy element, and a foaming element.

9. A method of generating a security element in an article, wherein the article is at least from a group comprising of a passport, a travel document, and a visa, the method comprising the steps of:

providing at least one substrate; and providing at least one secure device; and irradiating electromagnetic radiation onto a connection element and a data carrier, wherein the security element comprises a marking element of the connection element and a further marking element generated in the data carrier;

wherein electromagnetic radiation is irradiation onto the substrate, wherein at least one additional marking element is generated in the substrate, and wherein the additional marking element comprises an additional security element.

10. The method according to claim 9, wherein the electromagnetic radiation is irradiated onto the data carrier, the connection element, or the substrate, and has one or more wavelengths in a visible region of an electromagnetic spectrum or in an ultraviolet region of the electromagnetic spectrum.

11. The method according to claim 9, wherein electromagnetic radiation is irradiated onto the data carrier, the connection element, and the substrate in a single pass or with same settings.

* * * * *